UNITED STATES PATENT OFFICE.

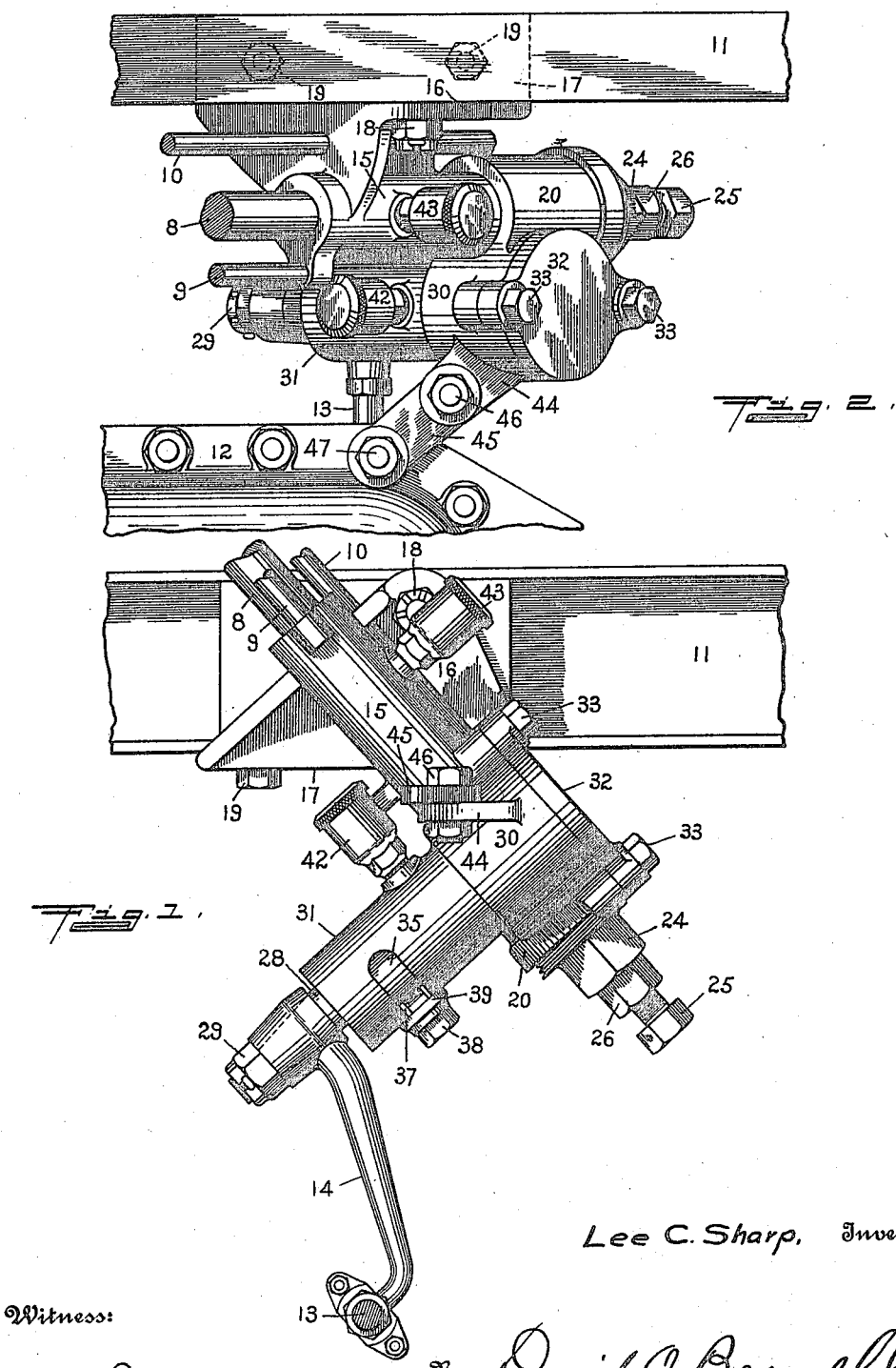

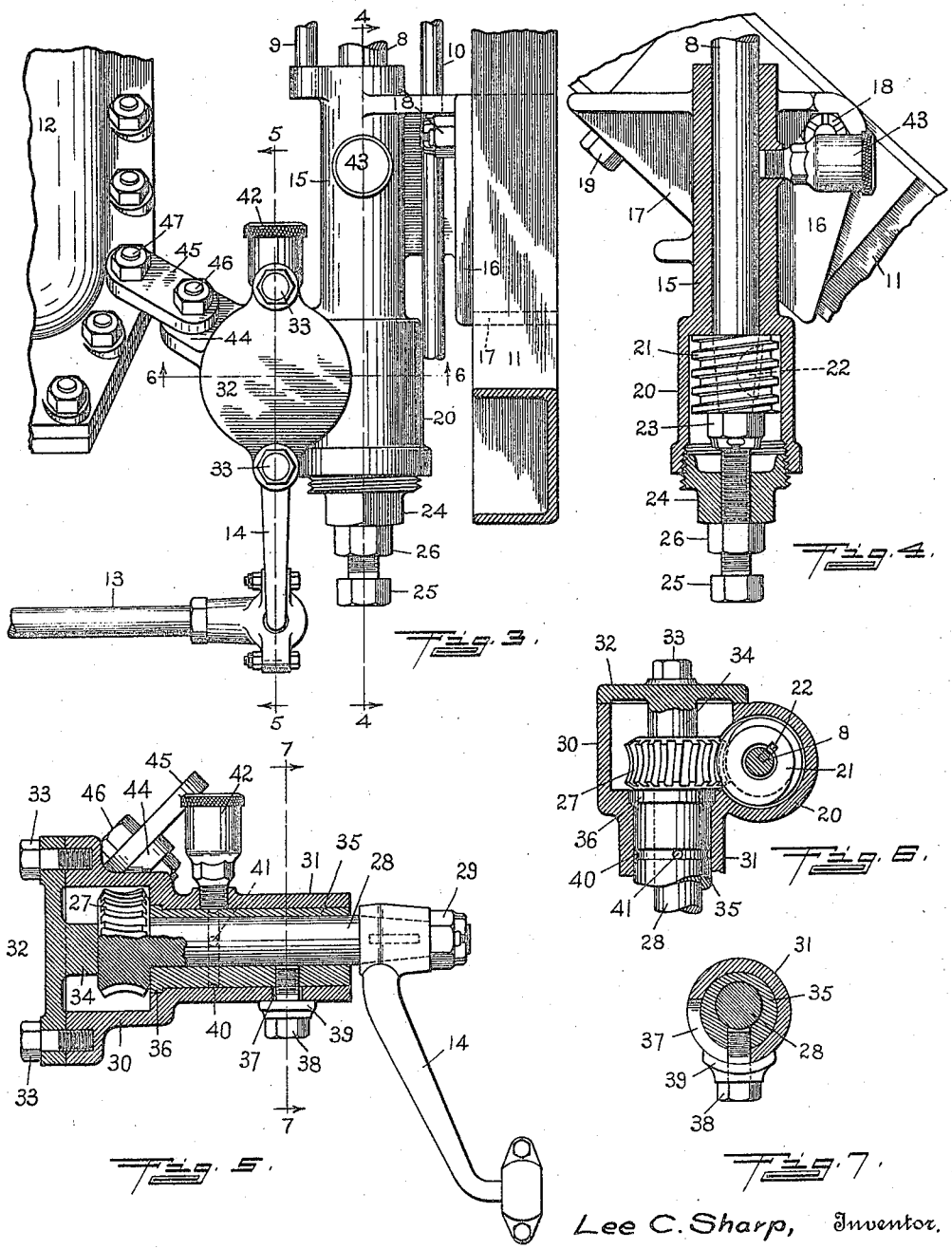

LEE C. SHARP, OF PLATTSMOUTH, NEBRASKA.

STEERING MECHANISM FOR MOTOR-VEHICLES.

1,386,737. Specification of Letters Patent. Patented Aug. 9, 1921.

Application filed February 18, 1916. Serial No. 79,193.

*To all whom it may concern:*

Be it known that I, LEE C. SHARP, a citizen of the United States, and a resident of Plattsmouth, in the county of Cass and State of Nebraska, have invented certain new and useful Improvements in Steering Mechanism for Motor-Vehicles, of which the following is a specification.

My invention relates to steering mechanism for motor vehicles, and particularly to worm-and-gear devices for providing an irreversible speed-reducing connection between the steering-post, or shaft carrying the hand-wheel, and the connecting-rod extending to the steering-knuckles on which the front wheels of the vehicle are mounted. It is the object of my invention to provide a simple and inexpensive device of this character, especially adapted to be substituted for the plain crank connection employed on certain motor vehicles, and having simple and positive means of adjustment for taking up wear of the working parts. A further object of my invention is to provide attaching means for the casing or housing, by which the same may be securely and firmly connected both to the side-frame of the vehicle and to the crank-case of the engine.

In the accompanying drawings, Figure 1 is a view of a device embodying my invention, as seen from the inner side, or that adjoining the engine, Fig. 2 is a plan view of the same, Fig. 3 is a view thereof as projected to a plane parallel with the steering-post, Fig. 4 is a detail section on the vertical plane of the line 4—4 of Fig. 3, Fig. 5 is a detail section on the plane of the line 5—5 of Fig. 3, Fig. 6 is a detail section on the plane of the line 6—6 of Fig. 3, and Fig. 7 is a detail section on the plane of the line 7—7 of Fig. 5.

The illustrated embodiment for my invention is especially designed for use on the well-known "Ford" motor vehicles, and is intended to be substituted for the plain crank device commonly used at the lower end of the steering-post in these vehicles. There are shown in the drawings certain of the ordinary parts of such a vehicle, said parts being those associated with my device and with which it is connected when in use. The parts referred to are the lower end-portion of the steering-post or shaft 8, adjacent parts of the throttle control rod 9 and spark control rod 10, a part of the side-frame 11 of the vehicle, a part of the crank-case 12 of the engine, a part of the connecting-rod 13 which extends to the cross-rod between the steering-knuckles, and the crank 14 which actuates said connecting-rod 13 and which is ordinarily connected directly with the lower end of the steering-post 8.

In the construction of my steering mechanism I provide a bearing 15 for a part of the steering-post 8 adjacent to the lower end thereof, said bearing having flanges 16 and 17 integral therewith, which are secured to the side-frame 11 by bolts 18 and 19, as shown. At the upper end of the bearing 15 the same has laterally extending lugs for the support of the rods 9 and 10. At the lower end the bearing 15 is enlarged and extended, as shown clearly in Fig. 4, to form a cylindrical casing or housing 20 large enough to inclose the worm 21. The latter is secured on the steering-post 8, fitting onto a conical portion thereof, being held in fixed rotational relation thereto by a key 22 as shown in Fig. 6, and being retained longitudinally by means of a nut 23 which is screwed onto the threaded end of the steering-post. The lower end of the housing 20 is normally closed by a screw-plug 24, and a screw 25 extends through said plug so as to bear against the lower end of the steering-post 8, said screw forming an adjustable end-thrust bearing for the post, and being retained in adjusted positions by means of a locknut 26 disposed thereon, as shown.

The worm 21 meshes at one side with a worm-wheel 27 of which the axis is at right angles with that of the worm and steering-post. The worm-wheel has a cylindrical shank or stem 28 which is coaxial and integral therewith and extends downwardly therefrom. The lower end of said stem is of the same form as the lower end of the steering-post 8, having a conical portion on which the hub of the crank 14 is fitted, and a threaded end-portion on which a nut 29 is screwed to hold the crank on the conical portion. The worm-wheel is inclosed by a casing or housing 30, which is integral with the worm-casing 20 and has a smaller cylindrical part 31 extending down from the lower axial end thereof. The upper axial end of the worm-wheel housing 30 is normally closed by a plate 32 which is secured thereon by screws 33. On the inner side of said plate 32 is a boss 34 which bears against the upper side of the worm-wheel, as best shown in Fig. 5. The worm-wheel stem 28 fits revolubly within the eccentric bore of a bearing-sleeve 35, and said sleeve fits revolubly in the housing part 31 that extends downwardly from the housing 30. At the upper end of the sleeve 35 is a projecting flange or collar 36 which fits into a corresponding recess in the bore of the sleeve-housing 31. In one side of said sleeve-housing there is a circumferential slot 37, and a screw 38 extends through said slot and into the side of the bearing-sleeve 35. Under the head of said screw there is an arcuate washer 39 which is wider than the slot and bears upon the outer surface of the housing. By tightening down said screw 38 the eccentric bearing-sleeve is retained in adjusted relations to the housing 31, and it will be readily seen that, by loosening the screw and rotating the sleeve to different positions with respect to the housing, the axis of the stem 28 and the worm-wheel may be moved toward and away from the axis of the worm and steering-post, so that the worm and worm-wheel may be adjusted to proper working relation regardless of wear of the parts.

In the outer surface of the sleeve 35 near the upper end thereof is an annular groove 40, and at one side there is a hole 41 extending in from said groove to the eccentric bore of the sleeve, in which the stem 28 is held. On the upper side of the housing 31, at a point longitudinally coincident with the groove 40, there is a threaded opening for an oil-cup 42, from which oil may pass into the groove and thence through the hole 41 to lubricate the stem 28. On the upper side of the bearing 15 there is placed an oil-cup 43, and it will be seen that oil therefrom will lubricate the engaging surfaces of said bearing and the steering-post 8, while any excess of lubricant will pass down into the worm-housing 20. The space within the housings 20 and 30 may be filled with hard-oil or grease to provide a lubricant for the worm and worm-wheel, in the usual manner, and a part of such lubricant may work down around the stem 28 to assist in the lubrication of the same.

On the side of the worm-wheel housing 30 adjacent to the engine crank-case 12 there is a lug 44 with which one end of a short flat link 45 is connected by means of a bolt 46. The lug 44 is so arranged that the other end of said link 45 may be connected with the crank-case by means of one of the bolts 47 thereof. The casing for the worm and gear, formed by the parts 15, 20, 30 and 31, is thus securely attached both to the side-frame 11 of the vehicle and to the crank-case of the engine, the latter connection being such that it will materially assist in the support of the steering-gear but will permit slight displacement or variation in the relations of the frame and engine.

It may be noted that, by the provision of the stem 28 integral with the worm-wheel, the latter is adequately supported, and, although it has a supporting bearing on only one side thereof, the length of the stem may be such as to provide ample bearing surface. Having the bearing for the worm-wheel stem upon only one side of the wheel facilitates the adjustment thereof, so that by mere rotation of the single eccentric bearing-sleeve the worm-wheel is moved toward or away from the worm to a proper working relation with respect thereto.

Now, having described my invention, what I claim and desire to secure by Letters Patent is:

In a steering mechanism for motor vehicles, the combination with a steering-post having a tapered lower end-portion, of a worm fitting upon said end-portion, means for removably securing the worm thereon, a worm-gear meshing with worm and having an integral axial stem, said stem having a tapered end-portion of the same form as the end-portion of the steering-post, a crank having a taper-bored hub adapted to fit upon the tapered end-portion of either said stem or said steering-post, means for removably securing said crank upon said end-portion of the stem, and a housing having bearings for said steering-post and worm-wheel stem and inclosing said worm and worm-wheel.

L. C. SHARP.